United States Patent Office 3,097,950
Patented July 16, 1963

3,097,950
CHEESE PRODUCT
Peter F. Noznick and Edwin A. Bernardoni, Chicago, Ill., assignors to Beatrice Foods Co., Chicago, Ill., a corporation of Delaware
No Drawing. Filed Apr. 1, 1960, Ser. No. 19,195
11 Claims. (Cl. 99—116)

This invention relates to a blue cheese product free of off flavors and devoid of any objectionable browning action sometimes experienced where milk solids are present. This invention eliminates use of milk solids.

*Example 1*

American blue cheese is ground and added to a vat having an agitator and containing tap water and about 4% disodium phosphate dissolved therein (based on the final dry weight of the cheese powder), the solution having a temperature of about 110° F. and the cheese becoming fluidized under the action of the emulsifier, the temperature, and the agitation to produce a mixture containing about 40% solids for ultimate spray drying. This mixture is further heated at about 145° F. for about 30 minutes so that the phosphate emulsifies the cheese and the emulsion is simultaneously pasteurized.

Thereupon the emulsion is homogenized at about 145° F. under about 1500 pounds p.s.i.g. and then spray dried.

About 1 to 5% of the disodium phosphate is useful in the foregoing example, preferably about 3%.

The initial temperature is at about 100° F. to 120° F. and the solids content is about 30 to 45% for ultimate spray drying.

The emulsion heating or second temperature stage is about 145° F. to 150° F. for 30 minutes to an hour to effect pasteurization and emulsification and produce a spray driable aqueous emulsion containing about 30 to 45% solids. Homogenization is at about 145° F. to 150° F. for the emulsion using a pressure range of about 1000 to 2000 p.s.i.g. followed by spray drying.

*Example 2*

In this example gum arabic was substituted for the phosphate and the emulsification system and simultaneous pasteurization worked with equally satisfactory results.

About 20% gum arabic i.e. gum arabic in the natural refined state, was used based on the dry weight of the ultimate cheese powder.

*Example 3*

A solution mixture of about equal parts of the gum acacia and the disodium phosphate was also used.

This proportion was also varied. When used alone, about 5 to 30% gum acacia was employed.

Admixed with disodium phosphate the proportions varied as described above to produce an emulsion containing about 30 to 45% solids for ultimate spray drying, i.e. from about 33⅓% gum acacia to 66⅔ phosphate to 66⅔ gum acacia to 33⅓ phosphate.

Instead of American blue cheese, Roquefort, Parmesan, Romano, Mozzarella and Cheddar cheeses to mention a few are used in this invention in accordance with the preceding examples. A wheel of the particular cheese or mixture of cheese is suitably ground and introduced to the aqueous emulsifying solution in the vat or kettle.

*Example 4*

In this example a blue cheese (Roquefort) wheel was ground, and about 97% added to the tap water containing about 3% disodium phosphate (based on the dry weight of the final cheese powder) in solution therein. The solution temperature was 130° F. The emulsion was produced simultaneously with pasteurizing at 145° F. for 30 minutes and then spray dried.

The initial temperature of the solution was varied between about 120° F. to 140° F. and was preferably 130° F. The disodium phosphate varied between about 1 and 5% and was preferably about 3%.

Homogenizing was carried out as described above and in some examples was omitted. Homogenizing however is preferred. Pasteurizing-emulsifying was at a temperature of about 145° to 150° F. for 30 minutes to an hour.

*Example 5*

This example was like the preceding example except that "Tenox 2" (a butylated hydroxy anisole made and sold by Eastman Chemical Co., Rochester, New York, and Tennessee) was used. This compound acted as a stabilizer on the fat present to keep it from retrograding and was used in amount of about 0.6% of the fat.

*Example 6*

In this example 20% gum acacia was substituted for the phosphate as the emulsifier. About 80% blue cheese solids were used. Otherwise this example was similar to the preceding ones.

In all examples, off flavors and browning were avoided by substantial elimination of milk solids, as will be noted.

*Example 7*

Disodium phosphate was dissolved in hot water at about 120° F. Ground Cheddar cheese was added and the mixture heated to and held at about 150° F. for about 45 minutes with strong stirring. The emulsion was now homogenized at 1000 pounds p.s.i.g. at 150° F. and thereafter spray dried to provide a Cheddar cheese powder.

In this example and related examples the amount of disodium phosphate was added depending on the original type of Cheddar cheese i.e. mild or strong. Thus about 1 to 5% by weight based on the final weight of the Cheddar cheese powder.

For a mild Cheddar about 5% phosphate is generally used and the range is about 3 to 5%. For a sharp Cheddar the range is about 1 to 3% and about 3% is usually employed, in the foregoing example.

The hot water solution of disodium phosphate varies between about 100° F. to 150° F. preferably 120° F. The heating and simultaneous pasteurizing varies between about 140° F. to 160° F. preferably 150° F. and the hold time from about 45 minutes to one hour, preferably 40 minutes.

Homogenization takes place at from about 500 pounds p.s.i.g. to 2000 pounds p.s.i.g. and with the emulsion at a temperature of about 140 to 160° F., preferably 150° F.

The spray dried powders of this application are useful for cheese spreads, macaroni and cheese combinations, and coatings for crackers and baked products among other varied uses.

The Cheddar is added initially as broken cheese, cut or ground.

The emulsion contains about 30 to 45° cheese solids in the aqueous suspension, preferably about 35%, before spray drying.

Various cheese colors may be added to the emulsion, notably just before pasteurization and emulsifying, such as the water in oil type or other colors as supplied to the industry by the well-known Chris Hansen Laboratories and called Chris Hansen's colors.

*Example 8*

In this example we dissolved the disodium phosphate in whey, namely cottage cheese whey (acidified whey having a pH of 4.5 to 5.0) of pH 4.8 in this instance, instead of the hot water of Example 7. We then added the Cheddar cheese as above and made the end product as described in Example 7 having delectable acid taste and enhanced flavor.

Example 9

Instead of using only Cheddar cheese solids, we used 80% and first made an aqueous solution of 20% gum acacia to form a milder end product. The water was at about 120° F. We then added the Cheddar cheese in broken-up condition and proceeded as above set forth. The final cheese solids content before spray drying was about 35%.

From about 5 to 25% gum acacia is useful in this example.

The temperatures of the water at the time of solution of the gum acacia therein ranged from about 100 to 150° F. preferably 120° F. as described. The example proceeds otherwise as stated in Example 7.

As stated above, the cheese powders of this invention which are substantially free of milk solids and devoid of off flavors and browning, are useful in preparation of various foods and the products are also useful as the emulsions, with or without homogenizing, but preferably after homogenizing and without spray drying, for similar food products and dressings. The aqueous products may be concentrated to any desired concentration and used in this form or reconstituted with water, milk, i.e. skim or whole milk, buttermilk, and cream, vinegar, oils, etc., and suitable flavors and colors are added as desired. Also, the powder products described herein are useful when similarly reconstituted, flavored and colored, as desired. These various liquid products, moreover, are attractive tasting and flavored cheese dressings, sauces and toppings.

From the foregoing, it will be observed that we have produced from an aqueous emulsion a cheese powder from Roquefort (or blue cheese), Cheddar, etc., comprising the cheese and an edible water soluble emulsifier, e.g. gum acacia and disodium phosphate, the powder being substantially free of milk solids and substantially devoid of off flavors and browning. The process comprises mixing broken or ground cheese in the heated water containing a water soluble edible emulsifier, and continuing the heating until an emulsion of the cheese is formed in the aqueous emulsifier solution. Preferably, the cheese emulsion is homogenized and spray dried, but it can be concentrated to any desired concentration and used with or without homogenizing. Preferably, the cheese emulsion is formed accompanied with simultaneous pasteurization.

We claim:

1. A process comprising mixing broken cheese with heated water and disodium sulfate as a water soluble edible emulsifier, and continuing the heating until an emulsion of the cheese is formed in the aqueous emulsifier solution.
2. A process according to claim 1 wherein the emulsion is homogenized.
3. A process according to claim 2 wherein the homogenized emulsion is spray dried.
4. A process according to claim 1 wherein the emulsion is homogenized and concentrated.
5. A process according to claim 1 wherein the cheese is blue cheese.
6. A process according to claim 1 wherein the cheese is Cheddar cheese.
7. A process according to claim 1 wherein the emulsification is accompanied by pasteurization.
8. A process according to claim 1 wherein the heated aqueous emulsifier solution-cheese mixture had a temperature of about 100° F. to 160° F., wherein the emulsion was produced by holding this mixture at about 140° F. to 160° F. to simultaneously pasteurize the same.
9. A process according to claim 8 wherein the emulsion is homogenized at a temperature between about 140° F. to 160° F. and a pressure of about 500 p.s.i.g. and 2000 p.s.i.g.
10. A process according to claim 9 wherein the emulsion has about 30% to 45% cheese solids.
11. A process according to claim 10 wherein the homogenized emulsion is spray dried.

References Cited in the file of this patent
UNITED STATES PATENTS

| | | |
|---|---|---|
| 1,997,866 | Irvin | Apr. 16, 1935 |
| 2,081,273 | Guttenberg et al. | May 25, 1937 |
| 2,279,202 | Musher | Apr. 7, 1942 |

OTHER REFERENCES

"Synthetic Food Adjuncts," by Jacobs, D. Van Nostrand Company, Inc., 250 Fourth Ave., New York 1947, pp. 198 and 199.

"The Making of Processed Cheese," by Sommer et al., Research Bulletin 137, June 1939, Agricultural Experiment Station of the Univ. of Wisconsin, Madison, pp. 6–9.

UNITED STATES PATENT OFFICE
CERTIFICATE OF CORRECTION

Patent No. 3,097,950                          July 16, 1963

Peter P. Noznick et al.

It is hereby certified that error appears in the above numbered patent requiring correction and that the said Letters Patent should read as corrected below.

In the grant, line 1, and in the heading to the printed specification, line 3, for "Peter F. Noznick", each occurrence, read -- Peter P. Noznick --; column 4, line 3, for "sulfate" read -- phosphate --.

Signed and sealed this 14th day of January 1964.

(SEAL)
Attest:

ERNEST W. SWIDER

Attesting Officer

EDWIN L. REYNOLDS

Acting    Commissioner of Patents